No. 617,508. Patented Jan. 10, 1899.
J. KEEPERS.
TIRE TIGHTENER.
(Application filed Mar. 22, 1898.)
(No Model.)
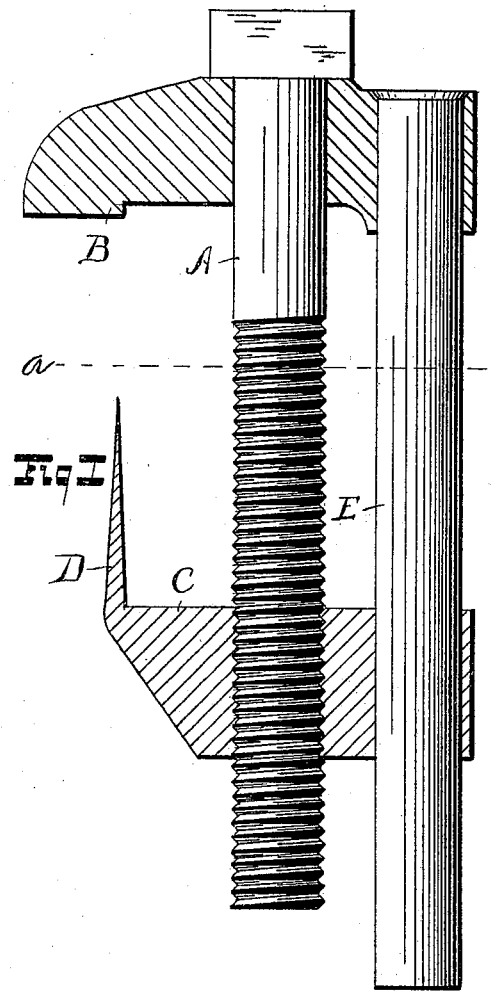
Fig I.
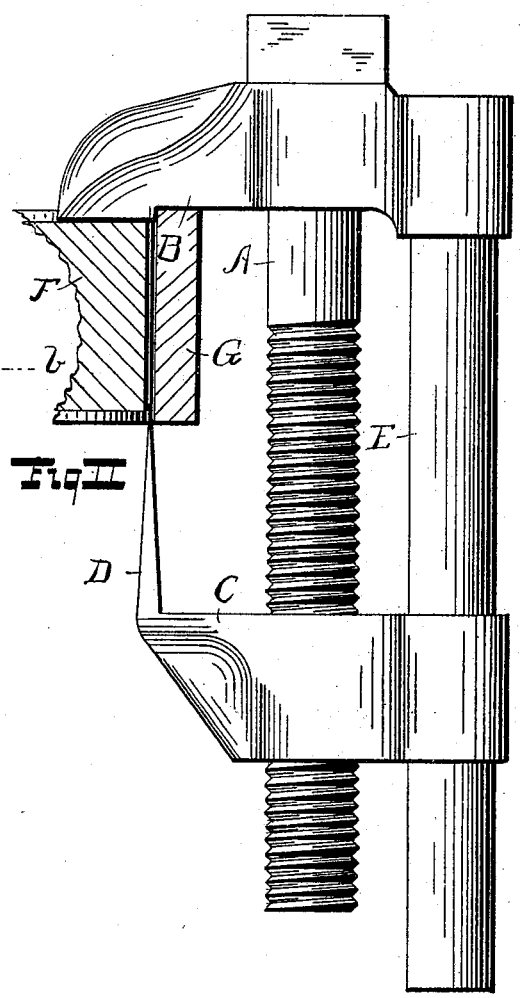
Fig II.
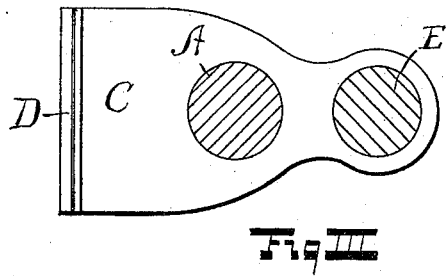
Fig III.
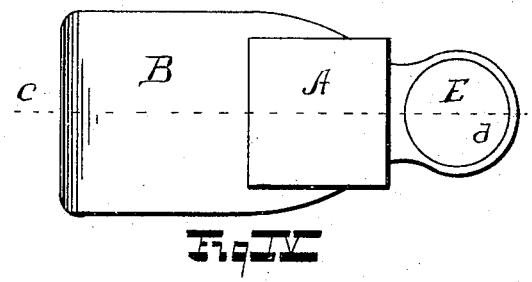
Fig IV.
WITNESSES:
A. H. Russell
E. E. Chandler.
INVENTOR,
J. Keepers,
BY Warren D. House,
His ATTORNEY.

UNITED STATES PATENT OFFICE.

JOHN KEEPERS, OF OLATHE, KANSAS, ASSIGNOR OF TWO-THIRDS TO M. V. B. PARKER AND J. C. KEEPERS, OF SAME PLACE.

TIRE-TIGHTENER.

SPECIFICATION forming part of Letters Patent No. 617,508, dated January 10, 1899.

Application filed March 22, 1898. Serial No. 674,738. (No model.)

*To all whom it may concern:*

Be it known that I, JOHN KEEPERS, a citizen of the United States of America, residing in Olathe, Johnson county, and State of Kansas, have invented certain new and useful Improvements in Tire-Tighteners, of which the following is a specification, reference being had therein to the accompanying drawings.

My invention relates to improvements in tire-tighteners.

The object of my invention is to provide a tire-tightening device by means of which the tire of a wheel may be tightened upon the fellies without removing the wheel from the vehicle and without throwing the wheel out of true.

My invention provides a device by means of which the tire may be sprung out from the fellies for the introduction between the tire and the fellies of a filler which will compensate for the shrinkage of the spokes or fellies.

My invention provides, still further, a tire-tightening device comprising a fixed and a movable jaw, one of the jaws being provided with a wedge-shaped blade adapted to be forced between the tire and the fellies, and means for moving the said movable jaw toward and from the fixed jaw.

My invention comprises, further, two jaws mounted upon a suitable support, one of the jaws being movable thereon toward and from the other jaw, one of the jaws being provided with a wedge-shaped blade for inserting between the tire and the fellies, and a screw-threaded bolt connecting the two jaws for drawing the jaws together.

My invention provides, further, certain novel and useful features of construction hereinafter fully described and claimed.

In the accompanying drawings, illustrating my invention, Figure I represents a vertical sectional view of the tire-tightener. Fig. II represents a side elevation view of the same, showing a portion of a tire and a portion of a felly in section and embraced by the tire-tightener, the blade thereof being about to enter between the tire and the exterior periphery of the felly. Fig. III represents a cross-sectional view taken on the dotted line of Fig. I, indicated by $ab$. Fig. IV represents a top view of the tire-tightener. The dotted line $cd$ of this figure indicates the line on which the section shown in Fig. I is taken.

A indicates a bolt having a head at one end and screw-threaded from the other end.

B indicates a fixed jaw, and C a movable jaw, the jaw C being provided at one end with a vertical wide wedge-shaped blade D. The two jaws B and C are oppositely disposed, the blade on the jaw C extending toward the other jaw. The right end of the jaw B, as viewed in Fig. II, is rigidly secured to the upper end of a vertical supporting-bar E, which may be of any suitable shape in cross-section and which has the jaw C movable thereon lengthwise. Each of the jaws B and C is provided with a vertical hole therethrough. These two holes are located so as to have the same axial center. The hole in the jaw B is large enough to permit the rotation therein of the bolt A, and the hole in the jaw C is screw-threaded, so as to fit the screw-threaded portion of the bolt A.

My invention is operated as follows: The jaw B is placed upon one side or the other of the tire G and felly F, as shown in Fig. II, with the jaw C upon the opposite side thereof. The bolt A is then turned in a direction such as will force the blade D of the movable jaw between the tire and the felly. When the blade D has entered sufficiently far to make the distance between the tire and the felly wide enough to admit a filler of the right thickness, a common steel wedge-shaped chisel eight or ten inches long and corresponding in shape to the blade D is inserted in the opening between the tire and felly and next to the tire-tightener. This wedge holds the opening, and the tire-tightener is then removed a distance of, say, six or eight inches around the tire, and the blade D is again inserted between the tire and felly at that point in the manner already described. There is now between the steel wedge and the tire-tightener an open space between the tire and the felly. Into this space may be inserted a filler of any suitable material, but preferably a portion of a common wooden berry-box, such being usually convenient to obtain, is of about the right thickness, and is quickly and neatly trimmed after being secured in position. After the insertion of the first piece of filler the wedge is withdrawn and driven between the tire and the filler adjoining the tire-tightener, which is again removed a distance similar to the distance of the last removal, after which the blade D is again inserted, thus making a new opening between the tire and fellies adjacent to the end of the filler. A new filler is then inserted in the opening thus made. These operations are continued until the tire is sufficiently tightened. After the dry season the tire may be loosened by reversing the operations described and withdrawing the pieces of filler. In cases where bolts are used to secure the fellies to the tire the nuts thereon are first loosened, after which the fillers are inserted in the manner already described. Where a bolt occurs the filler may have a notch cut out in the end, so as to permit its insertion, and thus have a continuous filler.

It will be observed that in tightening a tire with the employment of my invention the wheel is kept true and the fellies are forced snugly together, while with devices that act between the spoke and fellies, which force the fellies toward the tire, the inner periphery of the fellies make a larger circle than when they were first put together, and thus causes a space between contiguous ends of the fellies. It will be observed that the form of the fixed jaw B is such that the tire and felly both have a bearing thereon, as shown in Fig. II, the under side of the jaw being recessed, so as to admit the projecting portion of the edge of the tire. By this construction the fellies and tire are held from lateral movement, and thus prevents displacement of the fellies when the blade D is inserted between the tire and fellies.

In using my invention the tire may be tightened by any one without requiring the services of a skilled workman, and it may be done without taking the wheel from the axle.

My invention is capable of many modifications without departing from its spirit.

Having thus described my invention, what I claim, and desire to secure by Letters Patent, is—

1. A tire-tightener comprising a fixed and a movable jaw, a device carried by one of the jaws adapted to enter between the tire and the fellies and spread them apart, and means for moving the movable jaw toward the opposite one, substantially as described.

2. A tire-tightener comprising a fixed and a movable jaw, a wedge-shaped blade carried by one of the jaws upon the side adjacent to the other jaw, and means for forcing the jaws toward each other, substantially as described.

3. A tire-tightener comprising a fixed and a movable jaw, a device carried by one of the jaws adapted to enter between the tire and the fellies and spread them apart, and a bolt having screw-threaded connection with one of the jaws and rotatable in the other jaw, substantially as described.

4. A tire-tightener comprising a fixed and a movable jaw, a wedge-shaped blade carried on one of the jaws upon the side adjacent to the other jaw, and a bolt having screw-threaded connection with one of the jaws and rotatable in the other, substantially as described.

5. In a tire-tightener the combination with a suitable support, of a jaw fixed thereon, a jaw movable lengthwise thereon toward the other jaw, one of the jaws being provided with a wedge-shaped blade upon the side adjacent to the other jaw, and means for moving the movable jaw lengthwise upon the support, substantially as described.

6. In a tire-tightener, the combination with a suitable support, of a jaw fixed thereon, a jaw movable lengthwise upon the support and having a wedge-shaped blade upon the side adjacent to the other jaw, and a bolt rotatably mounted in one jaw and having screw-threaded connection with the other jaw, substantially as described.

7. In a tire-tightener, the combination with a fixed jaw, of a jaw movable toward the fixed jaw, one of the jaws being provided with a recess to receive the projecting edge of the tire, and the other jaw being provided with a wedge-shaped blade disposed oppositely to the said recess, and means for forcing the movable jaw toward or from the other jaw, substantially as described.

Signed by me, at Kansas City, Jackson county, Missouri, this 16th day of March, 1898, in presence of two witnesses.

JOHN KEEPERS.

Witnesses:
WARREN D. HOUSE,
E. E. CHANDLER.